(12) United States Patent
Watkins

(10) Patent No.: US 6,983,554 B2
(45) Date of Patent: Jan. 10, 2006

(54) COMPOSITION FOR CLEAR GAS BARRIER LAMINATES

(75) Inventor: Richard L. Watkins, Portland, OR (US)

(73) Assignee: Nike, Inc., Beaverton, OR (US)

(*) Notice: Subject to any disclaimer, the term of this patent is extended or adjusted under 35 U.S.C. 154(b) by 0 days.

(21) Appl. No.: 10/889,198

(22) Filed: Jul. 12, 2004

(65) Prior Publication Data

US 2004/0244223 A1  Dec. 9, 2004

Related U.S. Application Data

(62) Division of application No. 10/093,195, filed on Mar. 7, 2002, now Pat. No. 6,790,391.

(51) Int. Cl.
  *A43B 13/20* (2006.01)

(52) U.S. Cl. .................. 36/29; 36/35 B; 428/424.2

(58) Field of Classification Search ............... 264/37.3, 264/37.32, 280; 36/28, 29, 30 R, 35 R, 35 B, 36/44; 428/35.7, 36.6, 36.7, 423.1, 423.3, 428/424.2, 424.6
See application file for complete search history.

(56) References Cited

U.S. PATENT DOCUMENTS

| | | | |
|---|---|---|---|
| 5,713,141 A | | 2/1998 | Mitchell et al. |
| 5,864,968 A | * | 2/1999 | Mann .............................. 36/29 |
| 5,952,065 A | | 9/1999 | Mitchell et al. |
| 6,013,340 A | | 1/2000 | Bonk et al. |
| 6,082,025 A | | 7/2000 | Bonk et al. |
| 6,127,026 A | | 10/2000 | Bonk et al. |
| 6,321,465 B1 | | 11/2001 | Bonk et al. |
| 6,790,391 B2 | * | 9/2004 | Watkins ...................... 264/37.3 |

* cited by examiner

Primary Examiner—M. D. Patterson
(74) Attorney, Agent, or Firm—Harness, Dickey & Pierce, P.L.C.

(57) ABSTRACT

Scrap material having both a thermoplastic polyurethane and a copolymer of ethylene and vinyl alcohol is recycled by blending the scrap material into a thermoplastic polyurethane composition and preparing a barrier membrane from the blended material. The virgin thermoplastic polyurethane and the thermoplastic polyurethane of the scrap material are polymerized using at least about 60 percent by weight, based on the weight of the polyurethane produced, of a polyester diol having a weight average molecular weight of at least about 500 and having from four to five carbon atoms between substantially all of the ester [—O—C(=O)—] groups. The blend material containing the virgin thermoplastic urethane and the scrap material is formed into a layer of a barrier membrane. The resulting membrane has a haze of no more than about 12%.

30 Claims, 1 Drawing Sheet

COMPOSITION FOR CLEAR GAS BARRIER LAMINATES

CROSS-REFERENCE TO RELATED APPLICATIONS

This application is a divisional of U.S. patent application Ser. No. 10/093,195, filed on Mar. 7, 2002 now U.S. Pat. No. 6,790,391, the disclosure of which is incorporated herein by reference.

FIELD OF THE INVENTION

This invention concerns methods for making clear barrier membranes for cushioning devices for shoes. In particular, the invention relates to transparent, resilient laminate membranes including a thermoplastic polyurethane elastomer.

BACKGROUND OF THE INVENTION

Barrier membranes and inflatable bladders formed from such membranes have been used in footwear. It is often desirable to use thermoplastic polymeric materials to form the membranes because thermoplastic materials may be reclaimed and reformed into new articles, reducing waste during manufacturing operations and promoting recycling of scrap. Barrier membranes for inflated bladders can thus be made with a thermoplastic barrier layer. Thermoplastic polymeric barrier layer materials typically form crystalline regions or spherulites that serve to make the egress of fluid molecules through the layer more difficult.

Thermoplastic polymeric barrier materials with at a thickness adequate to provide the desired low gas transmission rate [GTR] generally do not have a low enough modulus for cushioning in shoes because the inflated bladder is subjected to high strains during use. In order to overcome this problem, the barrier materials have been blended or layered with elastic materials. Elastic materials, or elastomers, are able to substantially recover their original shape and size after removal of a deforming force, even when the part has undergone significant deformation. Elastomers may likewise be thermoplastic, and so a flexible, thermoplastic barrier film may be formed with a combination of thermoplastic elastomers and thermoplastic barrier layer materials.

In footwear, styling considerations have made low haze, transparent barrier membranes desirable. A blend material may be cloudy or hazy, however, if the materials blended together in a layer are not entirely compatible. A related problem arises in recycling scrap membrane material. When a membrane has been constructed with layers of different materials, those materials are not easily separated in the scrap. Consequently, the multi-layer scrap must be blended into one or another of the layer materials for recycling. For the desired clarity to be preserved in the blended layer, the multi-layer scrap material must be compatible with the layer material into which it is blended.

One type of thermoplastic elastomer that has been blended or layered with the barrier materials to make resilient membranes is thermoplastic polyurethane. Membranes including a first layer of a thermoplastic polyurethane, and a second layer including a barrier material, such as a copolymer of ethylene and vinyl alcohol, are described, for example, in U.S. Pat. No. 6,082,025, issued Jul. 4, 2000; U.S. Pat. No. 6,013,340, issued Jan. 11, 2000; U.S. Pat. No. 5,952,065, issued Sep. 14, 1999; and U.S. Pat. No. 5,713,141, issued Feb. 3, 1998, each of which is incorporated herein by reference. Although membranes with separate layers of the thermoplastic polyurethane material and the polymeric barrier material have had acceptable clarity, recycling scrap multi-layer membrane material by blending the scrap material into one of the layers has been problematic. In particular, the blended layer and membrane have noticeably lower reduced clarity because of incompatibility of the blended materials.

Thus, it would be desirable to have a transparent, multi-layer membrane in which the layer compositions are compatible so that incorporation of the multi-layer scrap into one layer of the membrane does not result in undesirable haziness.

SUMMARY OF THE INVENTION

The present invention provides an article of footwear in which the sole includes a visible, fluid-containing bladder. To be visible, at least a part of the bladder wall forms at least a part of an exterior portion of the sole. The bladder wall comprises a laminate membrane having low haze. The laminate membrane includes at least a first layer containing a polyurethane and a copolymer of ethylene and vinyl alcohol, and a second layer containing a copolymer of ethylene and vinyl alcohol. The polyurethane includes at least about 50 mole percent, based on the total moles of hydroxyl-functional reactants used to produce the polyurethane, of a polyester diol having a weight average molecular weight of at least about 500 and having a linear alkylene group having from two to about six carbon atoms between substantially all of the ester groups.

The invention further provides a method of manufacturing footwear, in which a laminate membrane is prepared with at least a first layer containing a polyurethane and a copolymer of ethylene and vinyl alcohol, and a second layer containing the copolymer of ethylene and vinyl alcohol. Again, the polyurethane includes at least about 50 mole percent, based on the total moles of hydroxyl-functional reactants used to produce the polyurethane, of a polyester diol having a weight average molecular weight of at least about 500 and having a linear alkylene group having from two to about six carbon atoms between substantially all of the ester groups. The blend of polyurethane and copolymer of ethylene and vinyl alcohol in the first layer is made by including recycled material of the polyurethane and copolymer of ethylene and vinyl alcohol in the layer, especially along with virgin material that includes at least the polyurethane. The recycled material has a first layer including the copolymer of ethylene and vinyl alcohol and a second layer including thermoplastic polyurethane material. Because of the particular polyurethane used, the blended material is very low in haze. The low haze is desirable for the aesthetic design of the footwear. The low haze membrane can be colorless or colored with dye or transparent pigment to provide a low haze colored membrane. The bladder may be filled with a colorless or colored fluid.

The membrane preferably includes the layer of blended material as an outer membrane layer in a multi-laminar structure. The transparent membrane of the article also preferably includes a barrier layer to prevent the transfer of fluid from one side of the membrane to the other, preferably with a thermoplastic elastomer layer between the layer of the blended material and the barrier layer. Such durable, elastomeric barrier membranes may be used to prepare inflated bladders. By "durable" it is meant that the membrane has excellent resistance to fatigue failure, which means that the membrane can undergo repeated flexing and/or deformation and recover without cracking and without delamination along the layer interfaces or cracking through the thickness of the membrane, preferably over a broad range of temperatures. For purposes of this invention, the term "membrane" is used to denote a free-standing film separating a fluid, preferably a gas at higher than atmospheric pressure, from the atmosphere outside of the article of footwear. Films that are wholly laminated or painted onto another article for purposes other than separating fluids, e.g., coatings, are excluded from the present definition of a membrane.

The layer of blended material of the invention has a low haze, by which is meant a haze of no more than about 12%, preferably no more than about 5%. Haze may be measured according to ASTM D-1003.

The transparent membrane is part of a bladder containing a fluid. The bladder may be inflated with a gas such as nitrogen, air, or a supergas. The term "supergas" refers to a large molecule gas that has a low solubility coefficient, such as $SF_6$, $CF_4$, $C_2F_6$, $C_3F_8$, and so on which are described in Rudy, U.S. Pat. Nos. 4,183,156 and 4,287,250, and Rudy et al., U.S. Pat. No. 4,340,626, incorporated herein by reference. A portion of the transparent membrane of the enclosure or bladder forms, or is visible through, at least part of an exterior wall of the article of footwear into which the bladder is incorporated.

The barrier membrane preferably has a gas transmission rate that is sufficiently low to allow the bladder to remain "permanently" sealed and inflated, that is, to retain a useful internal pressure for the useful life of the article into which it is incorporated. An accepted method for measuring the relative permeance, permeability, and diffusion of different film materials is ASTM D-1434-82-V. The gas transmission rate of a membrane is expressed at the quantity of gas per area per time that diffuses through the membrane. The gas transmission rate may be expressed in units of $(cc)(mil)/(m^2)(24\ hours)$, at standard temperature and pressure. The gas transmission rate of the barrier membrane provided by the invention is preferably less than about 1 $(cc)(20\ mils)/(m^2)(24\ hours)$.

BRIEF DESCRIPTION OF THE DRAWINGS

The present invention will become more fully understood from the detailed description and the accompanying drawing, wherein.

DETAILED DESCRIPTION OF THE INVENTION

Figure 1:
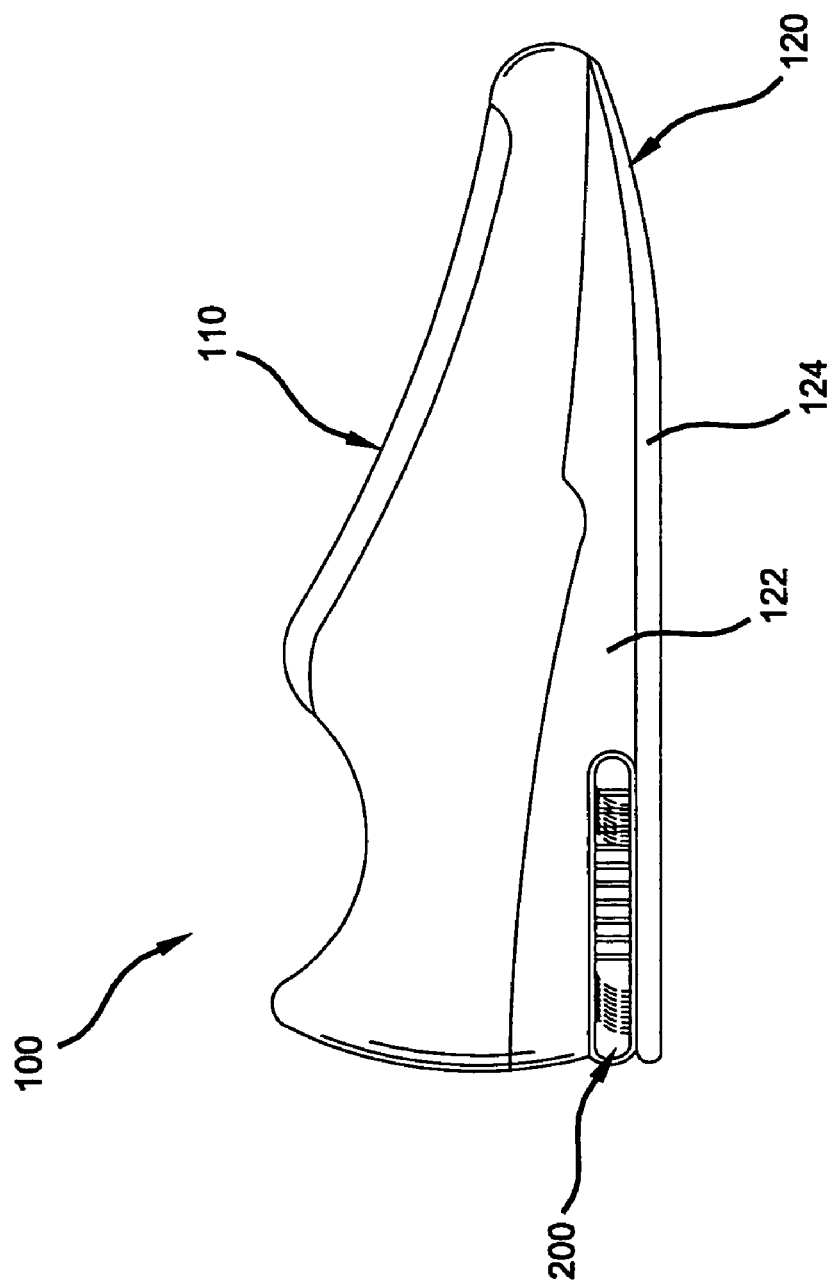
FIG. 1 shows a side view of an article of footwear according to the invention.

Referring to FIG. 1, there is shown a shoe 100 having an upper 110 and a sole 120 attached to the upper 110. The upper 110 can be formed form a variety of conventional materials including, but not limited to, leathers, vinyls, nylons, and other generally woven materials. The sole 120 includes a midsole 122 and an outsole 124. A bladder 200 containing a fluid, preferably a gas, is disposed in the midsole 122 to provide cushioning support to the foot.

Bladder 200 has as its walls a transparent, laminate membrane, which as shown in FIG. 1, forms at least a part of the exterior of sole 120. The transparent membrane has a first layer including a blend of a thermoplastic polyurethane and a copolymer of ethylene and vinyl alcohol and a second layer including a copolymer of ethylene and vinyl alcohol. The blend of the thermoplastic polyurethane and the copolymer of ethylene and vinyl alcohol has a low haze, preferably a haze of no more than about 12%, more preferably no more than about 5%. The composition of the blended first layer allows the bladder to have a desirable "crystal clear" appearance.

The thermoplastic polyurethane is polymerized from at least about 50 mole percent, preferably at least about 62 mole percent, more preferably at least about 65 mole percent, and yet more preferably at least about 69 mole percent of a polyester diol, the mole percent being based on the total moles of hydroxyl-functional reactants used to produce the polyurethane.

The polyester diol has linear alkylene groups having from two to about six carbon atoms between substantially all of the ester groups. By "substantially all" it is meant that not more than about 5 mole percent, preferably not more than about 2 mole percent, and most preferably none, of the alkylene groups between the ester groups have less than two or more than about six carbon atoms. The polyester can be prepared from diols of from two to six carbon atoms reacted with dicarboxylic acids having four to six carbon atoms and/or epsilon-caprolactone. Accordingly, the polyester diol may be prepared by reaction of one or more diols selected from ethylene glycol, 1,3-propanediol, 1,4-butanediol, 1,5-pentanediol, 1,6-hexanediol and combinations of these with one or more dicarboxylic acids selected from succinic acid, glutaric acid, adipic acid, anhydrides of these acids, and combinations thereof or with epsilon-caprolactone.

In a particularly preferred embodiment, the polyester diol is poly(epsilon-caprolactone) diol. Polyesters of epsilon-caprolactone may be prepared by initiating the self-condensation of the lactone with water or a diol, such as ethylene glycol, 1,3-propanediol, 1,4-butanediol, and so on. A lactone-based polyester diol may also be prepared by reacting the lactone with the hydroxyl groups of a polyester diol prepared from one or more of the dicarboxylic acids and one or more diols, as already described. In a preferred embodiment, the polyester diol is a poly(epsilon-caprolactone) diol with a weight average molecular weight of from about 1500 to about 3000, preferably about 1800 to about 2500.

The polyester diol preferably has a weight average molecular weight of at least about 500, more preferably at least about 1000, and even more preferably at least about 1800. The polyester diol may have a weight average molecular weight of up to about 10,000, but polyester diols having weight average molecular weight of up to about 5000, especially up to about 4000, are preferred. The polyester diol advantageously has a weight average molecular weight in the range from about 500 to about 10,000, preferably from about 1000 to about 5000, and more preferably from about 1500 to about 4000. The weight average molecular weights may be determined by ASTM D-4274.

The polyester polyol-based polyurethanes are formed by reaction of the polyester diol with at least one diisocyanate and, preferably, one or more extender compounds (also called chain extension agents) having two isocyanate-reactive functional groups. The diisocyanate may be selected from aromatic, aliphatic, and cycloaliphatic diisocyanates and combinations thereof. Representatives of useful diisocyanates include, without limitation, m-phenylene diisocyanate, the isomers of tolylene diisocyanate including 2,4-tolylene diisocyanate and 2,6-tolylene diisocyanate, mixtures of 2,4- and 2,6-tolylene diisocyanate, hexamethylene diisocyanate, tetramethylene diisocyanate, cyclohexane-1,4-diisocyanate, any of the isomers of hexahydrotolylene diisocyanate, isophorone diisocyanate, any of the isomers of hydrogenated diphenylmethane diisocyanate including methylene-bis-4-cyclohexyl isocyanate, naphthylene-1,5-diisocyanate, 1-methoxyphenyl-2,4-diisocyanate, any of the isomers of diphenylmethane diisocyanate, including 2,2'-diphenylmethane diisocyanate, 2,4'-diphenylmethane diisocyanate, and 4,4'-diphenylmethane diisocyanate, isomers of biphenylene diisocyanate including 2,2'-, 2,4'-, and 4.4°-biphenylene diisocyanates, 3,3'-dimethoxy-4,4'-biphenyl diisocyanate and 3,3'-dimethyl-diphenylmethane-4,4'-diisocyanate, isomers of tetramethylxylylene diisocyanate (TMXDI) including m-TMXDI and p-TMXDI, isomers of xylylene diisocyanate including p-xylylene diisocyanate and m-xylylene diisocyanate, butylene diisocyanate, 1,2-diisocyanatopropane, 1,3-diisocyanatopropane, ethylene diisocyanate, and combinations thereof. In one embodiment, the diisocyanate includes a diphenylmethane diisocyanate or mixtures of isomers thereof. Polyisocyanates having more than two isocyanate groups such as 1,2,4-benzene triisocyanate may be included at low levels, but it is preferred to use only diisocyanates.

Preferably, the reaction mixture of the polyester diol and the diisocyanate or diisocyanates further includes one or more chain extender molecules that have two groups reactive with isocyanate functionality selected from active hydrogen-containing groups such as primary amine groups, secondary amine groups, thiol groups, and hydroxy groups. The molecular weights of the chain extenders preferably range from about 60 to about 400. Alcohols and amines are preferred. Useful examples of extender compounds include, without limitation, diols, dithiols, diamines, or compounds having a mixture of hydroxyl, thiol, and primary or secondary amine groups, such as aminoalcohols, aminoalkyl mercaptans, and hydroxyalkyl mercaptans. Particular examples of such materials include, without limitation, ethylene glycol, diethylene glycol, and higher polyethylene glycol analogs like triethylene glycol; propylene glycol, dipropylene glycol, and higher polypropylene glycol analogs like tripropylene glycol; 1,3-propanediol, 1,4-butanediol, 1,3-butanediol, 1,6-hexanediol, 1,7-heptanediol, neopentyl glycol, dihydroxyalkylated aromatic compounds such as 4,4'-isopropylidene diphenol, (bisphenol A), resorcinol, catechol, hydroquinone, benzenedimethanols, the bis (2-hydroxyethyl) ethers of hydroquinone and resorcinol; p-xylene-α,α'-diol; the bis (2-hydroxyethyl) ether of p-xylene-α,α'-diol; m-xylene-α,α'-diol and the bis (2-hydroxyethyl) and alkylene oxide adducts of such diols; diethyl toluene diamine, polyalkylpolyamines such as ethylenediamine, diethylentriamine, and triethylenetetramine, difunctional polyoxyalkylene amines (available commercially from BASF Corporation or from Huntsman under the trademark JEFFAMINE®), methylenedianiline p-phenylenediamine, m-phenylenediamine, benzidine, 4,4'-methylene-bis (2-chloroaniline), alkanolamines and alkylalkanolamines such as ethanolamine, propanolamine, butanolamine, methylethanolamine, ethylethanolamine, methylpropanolamine, tert-butylaminoethanol, and combinations thereof. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these. In addition to the difunctional extenders, a small amount of trifunctional extenders such as trimethylol propane, 1,2,6-hexanetriol and glycerol, and/or monofunctional active hydrogen compounds such as butanol or dimethyl amine, may also be present. The amount of trifunctional extenders and/or monofunctional compounds employed is preferably 5.0 mole percent or less based on the total moles of active hydrogen reactants employed.

In general, the ratio of equivalents of polyisocyanate, which is preferably all diisocyanate, to combined equivalents of polyester diol and extender ranges from about 0.96 to about 1.05 equivalent of isocyanate to 1 equivalent of the combined polyester diol and extender. More preferred is a range of from about 0.98 to about 1.04 equivalents of isocyanate per equivalent of combined polyester diol and extender and even more preferred is a range of about 0.98 to about 1.02 equivalent of isocyanate to 1 equivalent of the combined polyester diol and extender to prepare the elastomeric polyurethane.

The thermoplastic polyurethane preferably has a weight average molecular weight of at least about 60,000, more preferably at least about 100,000. The thermoplastic elastomer also preferably has a weight average molecular weight of up to about 500,000, more preferably up to about 300,000.

The thermoplastic polyurethane composition of the first layer is blended with at least one copolymer of ethylene and vinyl alcohol. The copolymer of ethylene and vinyl alcohol may be included in the blended material in an amount from about 1 to about 12 percent by weight. Preferred copolymers of ethylene and vinyl alcohol have an average ethylene content of an amount from about 25 mole percent to about 48 mole percent. Particularly preferred are copolymers of ethylene and vinyl alcohol having a weight average molecular weight of at least about 20,000, and preferably a weight average molecular weight of up to about 50,000. Commercial products are available under the name SORANOL from Nippon Gohsei Co., Ltd. and under the trademark EVAL® from the Evalca Company (Lisle, Ill.), a subsidiary of Kuraray Co., Ltd. (Osaka, Japan).

The blend material can be prepared by combining at least partially virgin thermoplastic polyurethane and a recycled material of the copolymer of ethylene and vinyl alcohol. The recycled material may be a laminate having a layer including the copolymer of ethylene and vinyl alcohol and a layer including a thermoplastic polyurethane material. The thermoplastic polyurethane material of the recycled material preferably has the same composition as the thermoplastic polyurethane composition with which the recycled material is blended.

The laminate membrane further includes a second layer including a copolymer of ethylene and vinyl alcohol. The second layer may also include other materials that serve to block the egress of fluid (gas or liquid) molecules through the membrane. Examples of such materials include, without limitation, vinylidene chloride polymer; acrylonitrile polymer; copolymers of acrylonitrile and methyl acrylate; semicrystalline polyesters, such as polyethylene terephthalate; polyamides, particularly semicrystalline nylons; crystalline polymers; epoxy resins, including resorcinol-based epoxy resins, amines such as N,N-dimethylethylenediamine (DMDEA), JEFFAMINE® 600, 3-amino-n-propanol, and 4-amino-n-butanol; polyurethane engineering thermoplastics, such as the material available under the trademark ISOPLAST® from the Dow Chemical Company; and combinations of these materials. Preferably, the polymeric barrier material of the barrier layer consists essentially of ethylene-vinyl alcohol copolymer.

The membrane may include further layers in addition to the first (blend) layer and the second (barrier) layer. In one embodiment, the membrane includes at least one third layer of a thermoplastic elastomer, preferably the thermoplastic polyurethane already described, that does not include the copolymer of ethylene and vinyl alcohol. In one preferred embodiment, the membrane is formed with an inner layer (the second layer) of the barrier material composition adjacent on each side to layers of thermoplastic elastomer (the third layers), the membrane having exterior layers of the blend material (the first layers). The barrier (second) and elastomer (third) layers can be alternated in additional layers as desired, for example as layers of blend-elastomer-barrier-elastomer-barrier-elastomer-blend to make multi-layer laminate membranes.

Each of the first (blend), second (barrier), and third (elastomer) layers may include one or more modifiers and additives, preferably in minor amount. Examples of such modifiers and additives include, without limitation, plasticizers, light stabilizers, hydrolytic stabilizers, thermal stabilizers, brighteners, antioxidants, rheology modifiers, organic anti-block compounds, fungicides, antimicrobials (including bacteriocides and the like), mold release agents, waxes such as Montan esters or bis-amide waxes, processing aids, and combinations of these. Tinted transparent membranes may be formed with transparent colorants, such as dyes or transparent pigments. Special effects in the transparent membrane, e.g. iridescence, may be achieved by using special effect pigments.

Examples of hydrolytic stabilizers include two commercially available carbodiimide based hydrolytic stabilizers known as STABAXOL P and STABAXOL P-100, which are available from Rhein Chemie of Trenton, N.J. Other carbodiimide- or polycarbodiimide-based hydrolytic stabilizers or stabilizers based on epoxidized soy bean oil may be useful. The total amount of hydrolytic stabilizer employed will generally be less than 5.0 wt. % of the total weight of the layer.

Plasticizers can be included for purposes of increasing the flexibility and durability of the final product as well as facilitating the processing of the material from a resinous form to a membrane or sheet. By way of example, and without intending to be limiting, plasticizers such as those based on butyl benzyl phthalate (which is commercially available, e.g. as Santicizer 160 from Monsanto) have proven to be particularly useful. Regardless of the plasticizer or mixture of plasticizers employed, the total amount of plasticizer, if any, should generally be less than 20.0 wt. % of the total layer, preferably less than about 5% by weight of the total layer.

In a preferred method of forming the footwear of the invention, a scrap material containing both the thermoplastic polyurethane and a copolymer of ethylene and vinyl alcohol is blended into virgin thermoplastic polyurethane. Regardless of how the blended material is produced, the copolymer of ethylene and vinyl alcohol is included in the blended material in an amount of up to about 12 percent by weight, preferably up to about 5 percent by weight, based on the combined weights of copolymer of ethylene and vinyl alcohol and thermoplastic polyurethane. If prepared using scrap material having a layer of the thermoplastic polyurethane and a layer of the copolymer of ethylene and vinyl alcohol, the scrap material may be blended into the virgin thermoplastic polyurethane by any of the methods available in the art. In one preferred method, the scrap material is first ground and then fed into an extruder, either as a mixture along with pellets of the virgin thermoplastic polyurethane or through a separate port from the virgin thermoplastic polyurethane. The extruder may be a single screw or twin screw extruder. The ground scrap material and the virgin thermoplastic polyurethane are melt mixed in the extruder barrel and then extruded to form the first layer of the barrier membrane.

The layer of blended material of the membrane has a haze of up to about 12%, preferably no more than about 10%, more preferably no more than about 5% and still more preferably no more than about 1.5%. The haze of the membrane, having layers in addition to the blended material, in particular having a layer including the second layer with a copolymer of ethylene and vinyl alcohol, preferably has a haze of up to about 15%, preferably up to about 12%, and more preferably up to about 10%. The haze of the membrane or of the blended material may be measured by ASTM D-1003.

While the laminate membrane may be thin or thick, the laminate membrane should be thick enough to provide adequate wall strength and yet thin enough to provide adequate flexibility. Laminate membrane thicknesses from about 20 mils to about 70 mils are typical for blow molding operations. In the preferred five-layer structure (first layer—third layer—second layer—third layer—first layer), it is desirable for the barrier, second layer and the adjacent third, thermoplastic elastomer layer to each be at least about 0.4 mil thick, preferably at least about 0.5 mil thick, more preferably at least about 0.6 mil thick, and still more preferably at least about 1 mil thick; and for each of these layers to be up to about 3 mils thick, preferably up to about 2.5 mils thick, more preferably up to about 2 mils thick, and yet more preferably up to about 1.6 mils thick. The first, blend layers are preferably at least about 7 mils thick, more preferably at least about 8 mils thick, and still more preferably at least about 9 mils thick; and preferably up to about 20 mils thick, more preferably up to about 15 mils thick.

The membranes have a tensile strength on the order of at least about 2500 psi; a 100% tensile modulus of between about 350–3000 psi and/or an elongation of at least about 250% to about 700%.

The laminate membrane may be formed into a bladder by a blow molding process. In general, the bladders may be formed by a first step of coextruding the layers, or plies, in a laminate film of flat or tubular shape, then blow molding the film or tube into a desired final shape. For example, melt materials of the layers may be co-extruded as a parison. A mold having the desired overall shape and configuration of the bladder is in position to receive the parison and is closed around the parison. The parison is cut at the edge of the mold. The mold is moved back to a position away from the extrusion die. The open portion of the parison above the mold is then fitted with a blow tube through which pressurized air or other gas, such as nitrogen, is provided. The pressurized air forces the parison against the inner surfaces of the mold. The material is hardened in the mold to form a bladder having the preferred shape and configuration. The blown, shaped laminate is allowed to cool and harden in the mold, which may be at about 30° F. to 80° F., before it is removed from the mold. Meanwhile, a new mold is moved into place to accept the next section from the parison that has been cut away from the first mold.

Besides blow molding using continuous extrusion, the forming step may use intermittent extrusion by reciprocating screw systems, ram accumulator-type systems, or accumulator head systems; co-injection stretch blow molding; extruded or co-extruded sheet, blown film tubing, or profiles. Other forming methods include injection molding, vacuum molding, transfer molding, pressure forming, heat-sealing, casting, melt casting, RF welding and so on.

The laminate may undergo further forming steps. For example, a flat laminate film may be cut into a desired shape. Two portions of the flat film may be sealed at the edges to form a bladder. The laminate film may alternatively be rolled into a tube and RF welded at the edges to form a bladder.

The bladder may be inflated with a fluid, preferably a gas, and permanently sealed. The durable, elastomeric membranes of the inflated bladders are incorporated into the sole of an article of footwear, for example as shown in FIG. 1. By "durable" it is meant that the membrane has excellent resistance to fatigue failure, which means that the membrane can undergo repeated flexing and/or deformation and recover without delamination along the layer interfaces of composite barrier membranes, preferably over a broad range of temperatures.

Footwear, and in particular shoes, usually include two major components: a shoe upper and a sole. The general purpose of the shoe upper is to snugly and comfortably enclose the foot. Ideally, the shoe upper should be made from an attractive, highly durable, comfortable materials or combination of materials. The sole, constructed from a durable material, is designed to provide traction and to protect the foot during use. The sole also typically serves the important function of providing enhanced cushioning and shock absorption during athletic activities to protect the feet, ankles, and legs of the wearer from the considerable forces generated. The force of impact generated during running activities can amount to two or three times the body weight of the wearer, while other athletic activities such as playing basketball may generate forces of between six and ten times the body weight of the wearer. To provide these functions, the sole typically has a midsole or insole having cushioning and an outsole having a traction surface. The bladder preferably is applied to the insole portion of a shoe, which is generally defined as the portion of the shoe upper directly underlying the plantar surface of the foot.

The membranes preferably are capable of containing a captive gas for a relatively long period of time. In a highly preferred embodiment, for example, the membrane should not lose more than about 20% of the initial inflated gas pressure over a period of approximately two years. In other words, products inflated initially to a steady state pressure of between 20.0 to 22.0 psi should retain pressure in the range of about 16.0 to 18.0 psi for at least about two years.

The bladder may be inflated with air or components of air such as nitrogen, or with supergases, preferably with nitrogen, to an internal pressure of at least about 3 psi, preferably at least about 5 psi, and up to about 50 psi. Preferably the bladder is inflated to an internal pressure from about 5 psi to about 35 psi, more preferably from about 5 psi to about 30 psi, still more preferably from about 10 psi to about 30 psi, and yet more preferably from about 10 psi to about 25 psi. After being inflated, the inflation port may be sealed, for example by RF welding, for a permanently sealed inflated bladder.

For the bladders to remain permanently inflated, the gas transmission rate must be suitably low. In one preferred embodiment, the membrane of the bladder has a gas transmission rate toward the inflationary gas, which is preferably air or nitrogen gas, should be less than about 15 cubic centimeters per square meter per atmosphere per day ($cc/m^2 \cdot atm \cdot day$), preferably less than about 6 $cc/m^2 \cdot atm \cdot day$, particularly less than about 4 $cc/m^2 \cdot atm \cdot day$, more preferably less than about 2.5 $cc/m^2 \cdot atm \cdot day$, yet more preferably less than about 1.5 $cc/m^2 \cdot atm \cdot day$, and particularly preferably less than about 1 $cc/m^2 \cdot atm \cdot day$. An accepted method of measuring the relative permeance, permeability, and diffusion of different film materials is set forth in the procedure designated as ASTM D-1434. While nitrogen gas is the preferred captive gas for many embodiments and serves as a benchmark for analyzing gas transmission rates in accordance with ASTM D-1434, the membranes can contain a variety of different gases and/or liquids.

The invention is further described in the following example. The examples are merely illustrative and do not in any way limit the scope of the invention as described and claimed. All parts are parts by weight unless otherwise noted.

EXAMPLE 1

A dry blend of 80 parts by weight of a ground scrap material (10% by weight of copolymer of ethylene and vinyl alcohol, 90% by weight of a polyurethane based on poly (butanediol adipate)) and 20 parts by weight of virgin polyurethane having the same composition as the polyurethane of the scrap material was melt mixed using a twin screw extruder. The material was extruded and blow molded into a five-layer parison having layers A-B-C-B-A, with the A layers being of the blend, the B layers being of the polyurethane based on poly(butanediol adipate), and the C layer being of copolymer of ethylene and vinyl alcohol. The A layers were approximately 25 mils thick, the B layers approximately 2 mils thick, and the C layer approximately 0.7 mil thick.

The haze of the sample was measured and normalized to a value for a 20 mil sample of less than 12%.

The invention has been described in detail with reference to preferred embodiments thereof. It should be understood, however, that variations and modifications can be made within the spirit and scope of the invention.

What is claimed is:

1. An article of footwear, comprising an upper and a sole attached to said upper, said sole comprising a fluid-filled bladder comprising a laminate membrane,
   wherein said laminate membrane comprises
      at least a first layer comprising a thermoplastic polyurethane and a copolymer of ethylene and vinyl alcohol, wherein said thermoplastic polyurethane includes at least about 50 mole percent, based on the total moles of hydroxyl-functional reactants used to produce the polyurethane, of a polyester diol having a weight average molecular weight of at least about 500 and having a linear alkylene group having from two to about six carbon atoms between substantially all of the ester groups, wherein the first layer has a haze of not more than about 12%, and
      a second layer comprising a copolymer of ethylene and vinyl alcohol;
   wherein at least a part of said membrane forms at least a part of an exterior portion of said sole.

2. An article of footwear according to claim 1, wherein the first layer has a haze of not more than about 5%.

3. An article of footwear according to claim 1, wherein the membrane includes a dye or transparent pigment.

4. An article of footwear according to claim 1, wherein the fluid comprises a member selected from the group consisting of air, nitrogen, supergases, and combinations thereof.

5. An article of footwear according to claim 1, wherein the fluid is colored.

6. An article of footwear according to claim 1, wherein the first layer is an outer layer of the membrane.

7. An article of footwear according to claim 1, wherein the bladder is permanently sealed.

8. An article of footwear according to claim 1, wherein the membrane has a gas transmission rate, normalized for a 20-mil membrane thickness, of less than about 1 $(cc)(20 \text{ mils})/(m^2)(24 \text{ hours})$.

9. An article of footwear according to claim 1, wherein the thermoplastic polyurethane includes at least about 62 mole percent, based on the total moles of hydroxyl-functional reactants used to produce the polyurethane, of the polyester diol.

10. An article of footwear according to claim 1, wherein the polyester diol is a lactone-based.

11. An article of footwear according to claim 1, wherein the polyester diol is a poly(epsilon caprolactone) diol.

12. An article of footwear according to claim 11, wherein the poly(epsilon caprolactone) diol has a weight average molecular weight from about 1500 to about 3000.

13. An article of footwear according to claim 11, wherein the poly(epsilon caprolactone) diol has a weight average molecular weight from about 1800 to about 2500.

14. An article of footwear according to claim 1, wherein the polyester diol has a weight average molecular weight of at least about 1000.

15. An article of footwear according to claim 1, wherein the polyester diol has a weight average molecular weight from about 1000 to about 5000.

16. An article of footwear according to claim 1, wherein the thermoplastic polyurethane is formed by reaction of a mixture comprising a member selected from the group consisting of diphenylmethane diisocyanate and mixtures of isomers thereof.

17. An article of footwear according to claim 1, wherein the thermoplastic polyurethane is formed by reaction of a mixture comprising one or more chain extenders having two groups reactive with isocyanate functionality having molecular weight from about 60 to about 400.

18. An article of footwear according to claim 17, wherein the one or more chain extenders are selected from the group consisting of alcohols, amines, and combinations thereof.

19. An article of footwear according to claim 17, wherein the one or more chain extenders are selected from the group consisting of ethylene glycol diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations thereof.

20. An article of footwear according to claim 17, wherein the one or more chain extenders are employed in an amount of up to about 5.0 mole percent, based on the total moles of active hydrogen reactants.

21. An article of footwear according to claim 1, wherein said thermoplastic polyurethane has a weight average molecular weight of at least about 60,000.

22. An article of footwear according to claim 1, wherein said thermoplastic polyurethane has a weight average molecular weight from about 100,000 to about 500,000.

23. An article of footwear according to claim 1, wherein the first layer includes from about 1 to about 12 percent by weight of the copolymer of ethylene and vinyl alcohol.

24. An article of footwear according to claim 1, wherein the copolymer of ethylene and vinyl alcohol of the first layer has an average ethylene content from about 25 mole percent to about 48 mole percent.

25. An article of footwear according to claim 1, wherein the copolymer of ethylene and vinyl alcohol of the first layer has a weight average molecular weight from about 20,000 to about 50,000.

26. An article of footwear according to claim 1, wherein the second layer further comprises a member selected from the group consisting of vinylidene chloride polymer acrylonitrile polymer, copolymers of acrylonitrile and methyl acrylate, semicrystalline polyesters, polyamides, semicrystalline nylons, crystalline polymers, epoxy resins, resorcinol-based epoxy resins, polyurethane engineering thermoplastics, and combinations thereof.

27. An article of footwear according to claim 1, wherein the laminate membrane comprises a third layer, wherein the third layer comprises a thermoplastic elastomer.

28. An article of footwear according to claim 26, wherein the third layer consists essentially of a thermoplastic polyurethane and a copolymer of ethylene and vinyl alcohol, wherein said thermoplastic polyurethane includes at least about 50 mole percent, based on the total moles of hydroxyl-functional reactants used to produce the polyurethane, of a polyester diol having a weight average molecular weight of at least about 500 and having a linear alkylene group having from two to about six carbon atoms between substantially all of the ester groups.

29. An article of footwear according to claim 27, wherein the laminate membrane has the second layer as an inner layer, the third layer adjacent to the second layer on one side and a fourth layer having the composition of the third layer adjacent to the second layer on the other side, and the first layer and a fifth layer having the composition of the first layer as outermost layers.

30. An article of footwear according to claim 1, wherein the bladder has an internal pressure from about 5 to about 35 pounds per square inch.

\* \* \* \* \*

UNITED STATES PATENT AND TRADEMARK OFFICE
CERTIFICATE OF CORRECTION

PATENT NO. : 6,983,554 B2  
APPLICATION NO. : 10/889198  
DATED : January 10, 2006  
INVENTOR(S) : Richard L Watkins It is certified that error appears in the above-identified patent and that said Letters Patent is hereby corrected as shown below:

Column 5,  
Line 5, "4.4°" should be --4.4'--.

Column 11,  
Line 35, claim 19, after "ethylene glycol" insert --,--.  
Line 35, claim 19, "triethy lene" should be --triethylene--.

Signed and Sealed this

Eighth Day of August, 2006

JON W. DUDAS  
*Director of the United States Patent and Trademark Office*